Figure 1:
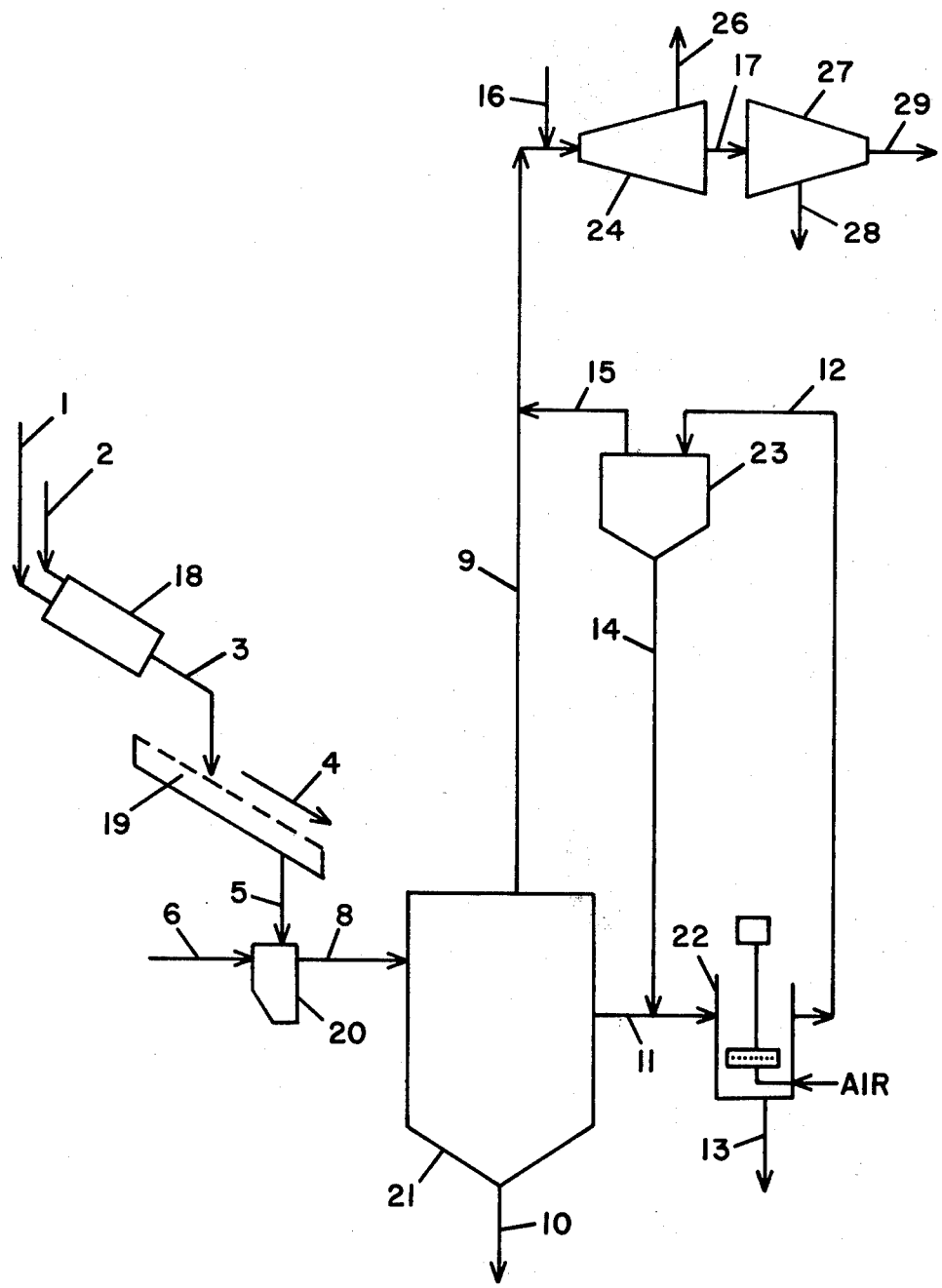
Figure 2:
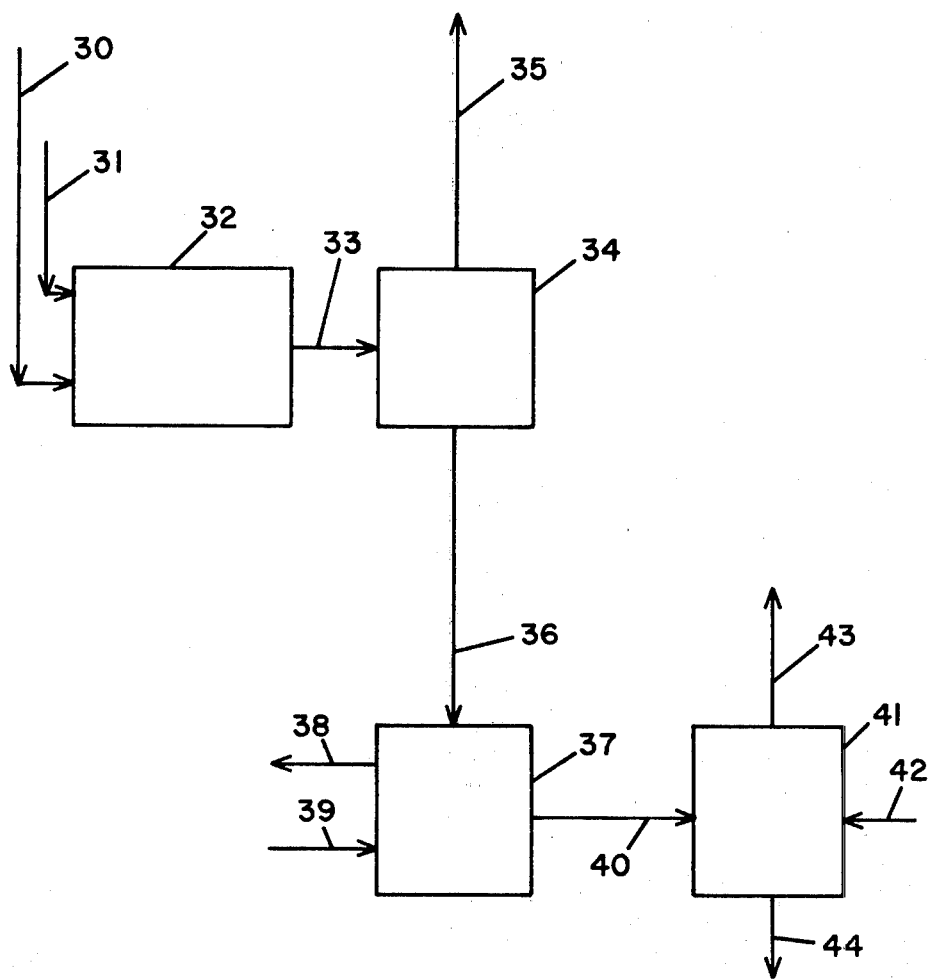

United States Patent [19]
Baillie et al.

[11] 3,990,885
[45] Nov. 9, 1976

[54] PROCESS FOR RECOVERING HYDROCARBONS AND HEAVY MINERALS FROM A TAR SAND HOT WATER PROCESS WASTE STREAM

[75] Inventors: Robert A. Baillie, West Chester, Pa.; Lawrence F. Schmoyer, Edmond, Okla.; Thomas E. Skarada, Wallingford, Pa.

[73] Assignee: Great Canadian Oil Sands Limited, Toronto, Canada

[22] Filed: Sept. 10, 1974

[21] Appl. No.: 504,477

[52] U.S. Cl. .............................. 423/70; 208/11 LE; 209/5; 209/10; 209/166; 423/578 R; 75/1 R; 75/1 T
[51] Int. Cl.² .......................................... C22B 1/00
[58] Field of Search ............... 75/101 R, 1; 208/11, 208/11 LE; 209/5, 10, 166; 423/578

[56] References Cited
UNITED STATES PATENTS

| | | | |
|---|---|---|---|
| 2,885,339 | 5/1959 | Coulson et al. | 208/11 LE |
| 2,965,557 | 12/1960 | Price | 208/11 LE |
| 3,808,120 | 4/1974 | Smith | 208/11 LE |

Primary Examiner—M. J. Andrews
Attorney, Agent, or Firm—J. Edward Hess; Donald R. Johnson; Gary V. Pack

[57] ABSTRACT

A method for removing bitumen from mineral particles recovered from bituminous froth recovered as a product of aqueous extraction of tar sands which method comprises scrubbing the minerals with a liquid hydrocarbon solvent containing at least 10 weight percent aromatics and thereafter separating the minerals from the solvent and subsequently drying the minerals.

7 Claims, 2 Drawing Figures

PROCESS FOR RECOVERING HYDROCARBONS AND HEAVY MINERALS FROM A TAR SAND HOT WATER PROCESS WASTE STREAM

BACKGROUND OF THE INVENTION

Bituminous tar sands are siliceous materials which are impregnated with a highly viscous crude hydrocarbon material. The largest and most important deposits of these sands are the Athabasca tar sands found in northern Alberta, Canada. These sands underlay more than 13,000 square miles at depths of 0 to 2000 feet. Total recoverable reserves after extraction and processing are estimated at more than 300 billion barrels of oil. The tar sands are mixtures of sand, water, and bitumen. The sand component is predominately quartz, particles of which are water-wet. A film of bitumen is closely associated with the particles, surrounding the sand grains and somewhat filling the void volume among them. This bitumen makes up from about 5 to 21 percent by weight of the total weight of tar sands with a typical content of 13 weight percent. The tar sands also contain clay and silt. Elemental analyses of the tar sands solids have also indicated the presence of zirconium and titanium.

To date, emphasis on development of bituminous tar sands has been placed in the area of the production of a synthetic crude oil. Thus, for example, the cold water process and the hot water process are well-known methods for the separation and recovery of bitumen from tar sands. In the cold-water method, separation is accomplished by mixing the sands with a solvent capable of dissolving the bitumen constituent. The mixture is then introduced into a large volume of water, water wth a surface agent added, or a solution of neutral salt in water. The combined mass is then subjected to a pressure or gravity separation.

In the hot water method, the bituminous tar sands are jetted with steam and mulled with a minor amount of hot water at temperatures in the range of about 150° to 200° F. In the separation cell, sand settles to the bottom as tailings and bitumen rises to the top in the form of an oil froth. An aqueous middlings layer containing some mineral and bitumen is formed between these layers. A scavenger step may be conducted on the middlings layer from the primary separation step to recover additional amounts of bitumen therefrom. This step usually comprises aerating the middlings as taught by K. A. Clark, "The Hot Water Washing Method", Canadian Oil and Gas Industries 3,46 (1950). The froth from the primary separation and the froth from the scavenger step can be combined, diluted with naphtha, and centrifuged to remove more water and residual mineral. The naphtha is then distilled off and the bitumen is coked to a high quality crude suitable for further processing. The hot water process is described in detail in Floyd et al., Canadian Pat. No. 841,581 issued May 12, 1970.

It has been discovered that the heavy metals, such as zirconium and titanium ores, are selectively separated from less dense metals by the above hot water process. In particular, zirconium and titanium are recovered as waste products from high speed centrifugation of bitumen froth extracted by hot water from tar sands.

Because titanium and zirconium are present in tar sands as salts or oxides in such small quantities, little effort thus far has been directed toward the recovery of these valuable minerals or their ores from the sands. It has been reported that tar sands solids contain about 0.05 weight percent elemental zirconium and 0.21 weight percent elemental titanium. (See Bowman, "Molecular and Interfacial Properties of Athabasca Tar Sands", 7th World Petroleum Conference, at page 590) Now, however, it has been found that zirconium as zircon and titanium as rutile are surprisingly highly concentrated in the sand separated from diluted bitumen in the centrifuging step of the hot water process.

The zirconium and titanium, which are the valuable metals in the tar sand minerals, are normally found in the form of zircon, ilmenite, anatase, and rutile. Zircon and rutile are the most valuable forms of the minerals in the mixture. When the mixture of heavy minerals is recovered from the waste stream of the hot water extraction process, the minerals are selectively wetted and in fact in many instances completely coated with bitumen. In order to separate the valuable minerals such as rutile and zircon from the less valuable minerals such as anatase and ilmenite, the minerals should be clean and dry since electrodynamic processing is employed. Procedures which at first glance would appear to be effective are calcining and/or roasting the bitumen-coated minerals to remove the hydrocarbons therefrom. However, these procedures have been found ineffective in that the roasting process, because of the high temperatures generated in burning off the hydrocarbon materials, alters the minerals in a manner that the electrodynamic processes no longer serve to provide an efficient means of separating the minerals selectively.

One process proposed in the prior art for recovering heavy metals from bituminous tar sands is proposed in U.S. Pat. No. 3,656,938 issued Apr. 18, 1972 to Penzes. The process provided in this patent includes air flotation of the minerals in a caustic solution. It is pointed out that large volumes of caustic are necessary in order to strip the bitumen from the minerals and subsequently the minerals must be washed to remove the caustic, all of which is both expensive and time-consuming. Thus, the prior art provides no distinctly attractive process for removing bitumen from the heavy minerals found in tar sands in a way which will provide for subsequent separation of those minerals into valuable products in an economic manner. A means to effectively cleanse heavy minerals from hydrocarbon materials found thereon to provide a mineral product suitable for separation by standard known methods has now been discovered.

DESCRIPTION OF THE INVENTION

In one aspect, the present invention is directed to the recovery of zircon and rutile from bituminous tar sands. In this aspect, the invention provides a process for recovering zircon and/or rutile from bituminous tar sands which contain said minerals. The process includes the steps of recovering a mineral-containing bitumen froth from a separation process for the treatment of bituminous tar sands, diluting the froth with a liquid hydrocarbon diluent, centrifuging at least a portion of the mineral-containing diluted bitumen froth to produce a bitumen product and a waste stream comprised of heavy minerals including zircon and rutile, as well as bitumen, diluent, and water. Subsequently, the heavy mineral stream is admixed with a solvent to remove the bitumen and other contaminants adhered to the surface of or mixed with the metal particles. The clean particles are subsequently washed with hot water and dried to provide clean dry heavy metal particles suitable for electrodymanic or other known processing techniques to separate the metals.

The solids portion of bituminous tar sands is unique in composition. The solids comprise major amounts of quartz, chert, chalcedony, and clays such as Kaolinite and Illite, heavy minerals such as Tourmaline, Stourolite and Epidote, iron minerals such as Pyrite, Pyourhotite, Siderite, Timonite, Magnitite, and Hematite, titaniferous minerals such as Ilminite, Leucoxene, and Rutile. Additionally, the solids portion is made up of minor amounts of Feldspars, Dolomite, Calcite, Micaceous minerals, Corundum, Garnet, Kyanite, Apatitie, Magnesite, Andalusite, Zoisite, Sillimanite, Pyroxenes, Amphi oles, Spinel, Phodchrosite, Chalcopyrite, Bornite, and Cassiterite (Bowman supra at page 590).

Because of the unique nature of these solids and the presence of hydrocarbon coatings on the heavy minerals therein, conventional methods of recovery of zircon and/or rutile from sands are not necessarily applicable for the recovery from the sands separated in the hot water process separation step. A process for the recovery of zircon and/or rutile from these separated sands has been found and another aspect of the present invention relates to this process.

FIG. I of the drawing is a schematic representation of a hot water process which provides a waster stream containing sand highly concentrated in zircon and rutile and contaminated with bitumen, water, and liquid hydrocarbon diluent from the process centrifuging step.

FIG. II of the drawings is a schematic representation of a process for the recovery of substantially clean heavy metals from the sand separated in the process centrifuging step.

The present invention will be described in reference to the drawings, FIGS. I and II. In FIG. I, bituminous tar sands are fed into the system through line 1 where they first pass to a conditioning drum or muller 18. Water and steam are introduced from 2 and mixed with the sands. The total water so introduced is a minor amount based on the weight of the tar sands processed and generally is in the range of 10 to 45 percent by weight of the mulled mixture. Enough steam is introduced to raise the temperature in the conditioning drum to within the range of 130° to 210° F. and preferably to above 170° F.

Mulling of the tar sands produces a pulp which then passes from the conditioning drum as indicated by line 3 to a screen indicated at 19. The purpose of screen 19 is to remove from the tar sand pulp any debris, rocks, or oversized lumps as indicated generally at 4. The pulp then passes from screen 19 as indicated by 5 to a sump 20 where it is diluted with additional water from 6.

The pulped and diluted tar sands are pumped from the sump 20 through line 8 into the separation cell 21. The cell contains a relatively quiescent body of hot water which allows for the formation of a bitumen froth which rises to the cell tp and is withdrawn via line 9 and a sand tailings which settles to the bottom to be withdrawn through line 10. An aqueous middlings layer between the froth and tailings layers contains silt and clay and some bitumen which failed to form froth.

A portion of the middlings containing about 3 to 5 weight percent bitumen is withdrawn from separator 21 through line 11 and is sent to a scavenger zone 22 wherein an air flotation operation is conducted to cause the formation of additional bitumen froth. The additional bitumen froth passes from the scavenger zone 22 through line 12 to a froth settler zone 23 or is combined directly in line 9 with the froth from the primary extraction zone. A bitumen-lean middlings stream is removed from the bottom of the scavenger zone 22 via line 13. This extraction process is set forth by Floyd et al., Canadian Pat. No. 841,581 issued May 12, 1970.

In settler zone 23, the scavenger froth forms into a lower layer of settler tailings which is withdrawn and recycled via line 14 to be mixed with bitumen-rich middlings for feed to the scavenger zone 22 via line 11. In the settler zone, an upper layer of upgraded bitumen froth forms above the tailings and is withdrawn through line 15 and is mixed with primary froth from line 9. The combined froths are at a temperature of about 160° F. the combined froth streams are heated with steam and diluted with sufficient naphtha or other liquid hydrocarbon diluent from 16 to reduce the viscosity of the bitumen for centrifuging in zones 24 and 27 to produce a bitumen product suitable for further processing. The centrifuging zone is preferably a two-stage centrifuging in which the first stage is scroll-type centrifuge 24 operated at a relatively low speed to remove residual water and the larger sand particles including the heavy metals via 26 from the bitumen froth. It is this mineral waste product from tar sands processing that provides the feed material suitable for use in the process of the present invention.

The second-stage centrifuge 27 receives the bitumen product from centrifuge 24 via line 17. The second-stage centrifuge is preferably a bowl and nozzle type centrifuge operated at higher speeds at which the remainder of the water in the bitumen as well as fines such as clay minerals are separated therefrom and recovered via line 28. The bitumen product suitable for further processing into petroleum products is recovered via line 29.

The heavy minerals separated from the diluted bitumen in the centrifuging step of a hot water extraction process as given above and which contains a high concentration of rutile and zircon are not amenable to direct mineral separation processing for recovery of the separate minerals because of the presence of bitumen and water.

If this mixture is directly subject to calcining or roasting, the characteristics of the recovered metals are changed so that they are not separated by electrodynamic processing. It appears that the high temperatures inherent in a direct process of burning off bitumen causes a change in metals such that they are not separable by magnetic or electrodynamic differentiation.

The present invention is directed to the removal of bitumen and moisture from the separated heavy minerals in the sand component of tar sands to provide a feed material from which zircon and rutile can be recovered. In this aspect, the invention comprises recovering a mineralcontaining bitumen froth product from a separation process for the treatment of bituminous tar sands, centrifuging at least a portion of the froth product to produce a bitumen product and a mineral product containing zircon and rutile, scrubbing the mineral product with a liquid hydrocarbon solvent to strip the residual bitumen from the surface of the minerals, settling the minerals in a hot water settling zone, and thereafter drying the minerals in a drying zone to provide a processable heavy mineral product.

As a means of further defining one mode of the process of the present invention, the illustration in FIG. II is provided.

Referring to the drawing in FIG. II, the heavy minerals recovered from the tar sand as provided via line 26 of FIG. 1 are transferred into mineral scrubber 32 via line 30. This stream is typically characterized as containing 1 to 10 weight percent bitumen including liquid hydrocarbon diluent added to the bitumen to reduce its viscosity and thereby make it a suitable feed for the centrifuging procedures. Normally, the feed contains about 2 to 5 weight percent bitumen. This stream also contains about 5 to 15 weight percent minerals with the remainder of the stream being water. A liquid hydrocarbon solvent normally boiling in the range of 100° to 600° F. is added to the mineral scrubber via line 31. The solvent employed preferably is a liquid hydrocarbon which is highly aromatic. Preferably, the solvent has a boiling range of 200° to 500° F. and contains at least 10 volume percent aromatic hydrocarbons. Solvents suitable for use include benzene, toluene, xylene, straight run petroleum naphtha, cracked petroleum naphtha, or any other liquid hydrocarbon stream boiling in the range of 100° to 600° F. and containing at least 10 volume percent aromatics. The solvent is added to the mineral-water feed stream in the ratio of from 1 part solvent per 1 part feed to 10 parts solvent per 1 part feed. Preferably 2 to 5 parts solvent to 1 part feed is used. Since the solvent serves to remove residual bitumen from the mineral-water feed stream, substantially all of the solvent can be recovered and recycled in the process. If desired, this recorded solvent can be used as a froth diluent. The recovered bitumen can also be converted by coking or hydrovisbreaking into suitable solvent for use in the process. Thus, in effect there is no economic loss attributed to use of this solvent to remove bitumen from the heavy mineral sand.

The minerals and solvent mixture is agitated in the mineral scrubber 32 while maintained at a temperature in the range of 100° to 200° F. and preferably in the range of 140° to 180° F. for the time necessary to dissolve the bitumen coating on the surface of the minerals. The time of agitation can vary from 1 to 100 minutes with about 2 to 10 minutes preferred. The minerals are thereafter transferred via line 33 into first settler zone 34. In the first settler zone 34, the heavy minerals settle to the bottom of the zone to form a lower layer while diluent and dissolved bitumen form an upper layer recovered from settler 34 via line 35. The minerals of the lower layer of settler 34 are withdrawn via line 36 and transferred into second settling zone 37 which is a hot water settling zone maintained at a temperature in the range of 100° to 212° F. and preferably about 200° F. Hot water is fed into settler zone via line 39 and a diluent water mixture is recovered from settler zone 37 via line 38. In the second settling zone, the diluent and dissolved bitumen are separated from the minerals via hot water washing. The minerals settle to the bottom of the zone and are withdrawn via line 40 and transferred to mineral dryer 41. In mineral dryer 41, the residual water is first removed by evaporation and the minerals are thereafter calcined at a temperature in the range of 400° to 1100° F. and preferably in the range of 700° to 900° F. to provide a clean dry mineral product substantially free of bitumen and hydrocarbons.

In operating the mineral dryer, one means of drying the minerals includes the addition of combustible gas via line 42. Burning the gas in the calciner provides the necessary heat to process the minerals therein. The liquid evaporating from mineral dryer 41 can be removed via line 43. The dry mineral product is recovered from mineral dryer 41 via line 44 to thereafter be processed by electrodynamic or other mineral ore separating procedures well known in the art.

Heavy metals such as the particles of zircon and rutile found in tar sands are valuable products if they can be separately recovered from the silica and bitumen of the tar sands. As currently recovered from the bitumen froth provided by hot water extraction of tar sands, these metal particles are at least partially coated with bitumen. The bitumen coating inhibits separation of the metal particles by currently utilized electrodynamic methods. Thus, in order to recover these valuable metals so that they may be separated for further processing, the removal of hydrocarbons from the surface of the particles is essential.

The present invention provides a method for removal of bitumen and other hydrocarbons from the surface of heavy metal particles which are recovered from tar sands froth provided by the extraction of tar sands using hot water aqueous procedures. Thus, by the method of the present invention, heavy metals such as zircon and rutile are provided in a form whereby they can be further processed and electrodynamically separated and, thus, available for recovery as a valuable product.

In general, the present invention provides a method for recovering processable heavy minerals from tar sands comprising:
a. recovering a bituminous froth containing heavy minerals from tar sends by aqueous extraction procedures;
b. separating the bituminous froth into a bitumen stream and a water mineral stream containing some bitumen;
c. scrubbing the water mineral stream with a liquid hydrocarbon solvent containing at least 10 weight percent aromatic hydrocarbons for the time necessary to remove bitumen from the surface of said minerals;
d. separating the scrubbed minerals from the liquid hydrocarbon solvent containing dissolved bitumen and
e. drying the minerals.

More specifically, one method of the present invention comprises a process for removing bitumen from the surface of minerals separated from a bituminous froth recovered from tar sands by way of a hot water extraction comprising:
a. admixing said minerals with a liquid hydrocarbon solvent boiling in the range of 100° to 600° F. and containing at least 10 volume percent aromatics;
b. agitating the mineral-solvent mixture for the time necessary to remove the major portion of bitumen from the surface of said minerals;
c. transferring the mineral-solvent mixture to a first settling zone and settling the mixture therein to provide an upper solvent layer and a lower layer of minerals and solvent;
d. transferring said lower layer from said first settling zone to a second settling zone containing a quantity of water at least equal to the volume of the lower layer;

e. settling said minerals in said second settling zone to form an upper layer of water and solvent and a lower layer of minerals and water and f. removing the mineral-water layer from said second settling zone and separating the minerals from the water to provide a mineral product substantially free of bitumen.

The invention claimed is:

1. In a process for recording bitumen and heavy minerals from tar sands by:
   a. separating bitumen froth together with solid components including heavy minerals from the sand in a main separation zone; and
   b. separating the bitumen froth from the solid components, thereby forming a mineral waste product stream containing solid components
      including heavy minerals selected from the group consisting of titanium and zirconium containing minerals and combinations thereof, the improvement in combination therewith comprising.
   c. adding to the mineral waste product stream a liquid hydrocarbon solvent boiling in the range of 100° to 600° F. and containing at least 10 volume percentage aromatic hydrocarbons;
   d. separating the heavy minerals from the solvent-mineral waste product mixture; and
   e. washing the heavy minerals to remove the remaining solvent, thereby producing a quantity of heavy minerals substantially free of bitumen and other hydrocarbon substances.

2. The improved process recited in claim 1, further comprising the step of drying the washed heavy minerals by applying heat to the washed heavy minerals after step (e).

3. The improved process recited in claim 2, further comprising the step of agitating the mixture of solvent and mineral waste product after step (c).

4. The improved process recited in claim 3, wherein the separation of the bitumen froth from the mineral waste product in step (b) is accomplished by centrifugal force.

5. The improved process recited in claim 4, wherein the separation of the heavy minerals from the solvent in step (d) is by gravimetrically settling the mixture in a settling zone to provide a lower layer of heavy minerals to be withdrawn for washing by step (e).

6. The improved process recited in claim 5, wherein water is used for washing the heavy minerals of step (e).

7. The improved process recited in claim 6, wherein the water used for the washing process of step (e) is maintained at a temperature between 100° to 212° F.

* * * * *